Figure 4:
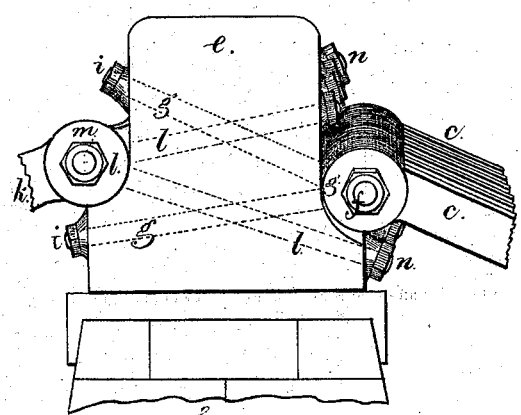

2 Sheets--Sheet 1.
E. W. SERRELL & E. W. SERRELL, Jr.
Chain Suspension Bridges.
No. 143,788.        Patented Oct. 21, 1873.
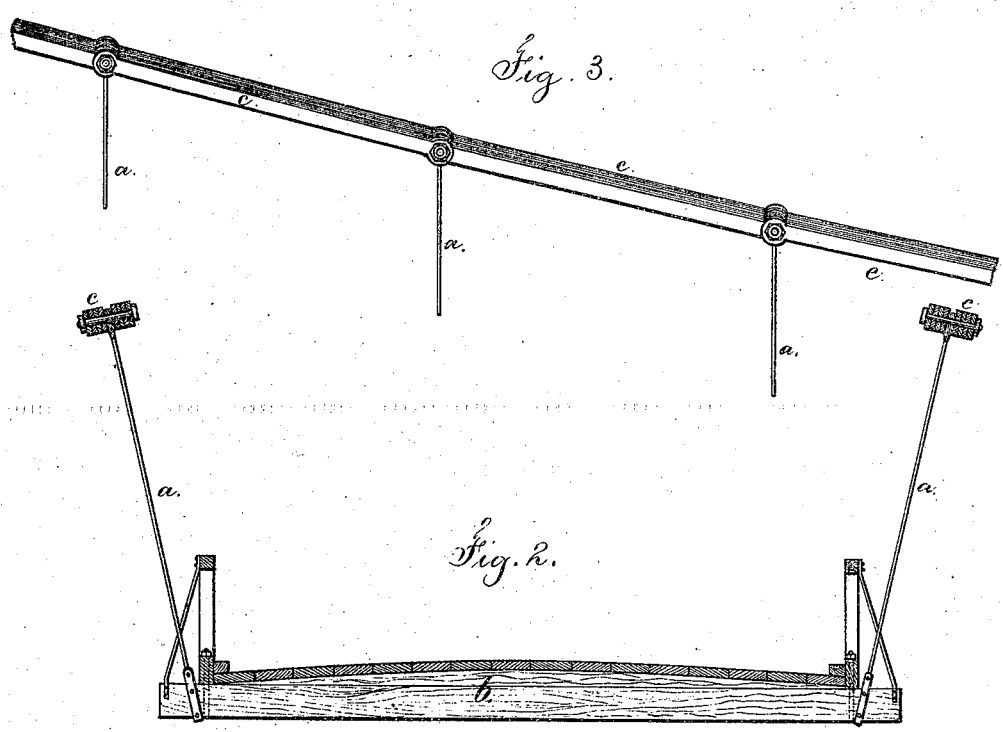
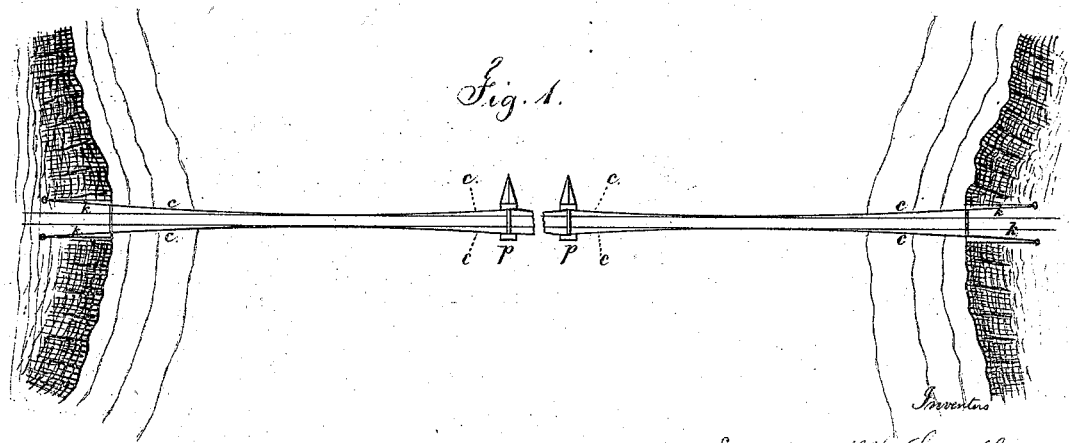
Witnesses
Chas. H. Smith
Geo. D. Walker
Inventors
Edward W. Serrell
Edward W. Serrell Jr.
by Lemuel W. Serrell
atty
AM. PHOTO-LITHOGRAPHIC CO. N.Y. (OSBORNE'S PROCESS)

2 Sheets--Sheet 2.

E. W. SERRELL & E. W. SERRELL, Jr.
Chain Suspension Bridges.

No. 143,788. Patented Oct. 21, 1873.

Witnesses
Chas H. Smith
Geo. D. Walker

Inventors
Edward W. Serrell
Edward W. Serrell Jr.
by Lemuel W. Serrell
atty.

AM. PHOTO-LITHOGRAPHIC Co. N.Y. (OSBORNE'S PROCESS)

UNITED STATES PATENT OFFICE.

EDWARD W. SERRELL AND EDWARD W. SERRELL, JR., OF NEW YORK, N. Y.

IMPROVEMENT IN CHAIN SUSPENSION-BRIDGES.

Specification forming part of Letters Patent No. 143,788, dated October 21, 1873; application filed April 1, 1873.

*To all whom it may concern:*

Be it known that we, EDWARD W. SERRELL and EDWARD W. SERRELL, Jr., of the city of New York, in the State of New York, have invented an Improvement in Suspension-Bridges, of which the following is a specification:

Suspension-bridges have been made with chains composed of plate-links, with eyes at the ends, pinned together; but, in consequence of the pins running horizontally, the chains had to hang in a vertical plane; otherwise, if the chains came nearer to each other at the bottoms of the catenary than at the towers, there would be an unequal strain on the links, and a cross-strain upon the pins, instead of a shearing strain only. Another difficulty arises in suspension-bridges constructed with parallel cables, which is that the back-stays to the anchors are also parallel to one another, and cannot be spread apart. These conditions render the bridge liable to lateral swaying movements, that often cause its destruction. Suspension-bridges have been built, to a great extent, with cables of wire, so that the cables at the towers can be much farther apart than at the bottoms of the catenary, and so that the cables can be spread in passing from the towers to the anchors, thereby lessening the risk of lateral motion in the bridge. Wire cables, however, are very costly, and contain much more material than is necessary. Of course, the cable has to be laid up at great expense, and is very difficult to handle and get into place, and, being of uniform size throughout, and of the strength required at the towers, is unnecessarily heavy near the middle of each span, which detracts from the strength of the structure to the extent of its own unnecessary weight, and increases the cost in like manner.

The object of our invention is to construct a chain-bridge in such a manner that all the advantages of the wire cable are obtained, and its disadvantages avoided, thereby lessening the cost, decreasing the useless weight, increasing the strength, and saving time in the erection of the bridge. We construct the saddles at the end towers with connecting-eyes for the links of the chains, and place those eyes at right angles to the planes in which the chains hang, so that the chains between the towers and the anchors can diverge, and the chains between the towers can converge, and be much nearer together at the lower parts of the catenary than at the towers, whereby the chains between the towers, although hanging in planes at an inclination to the vertical, will have all the joint-pins in each chain parallel, and at right angles to the plane in which the chain hangs, and hence each part will take its proper amount of strain.

Figure 6:
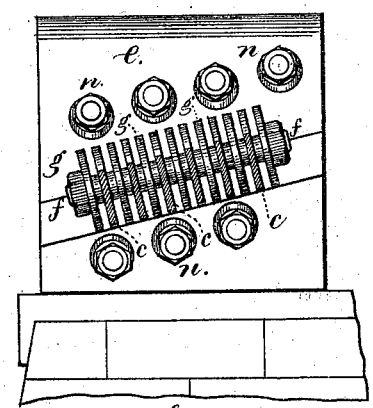
Figure 5:
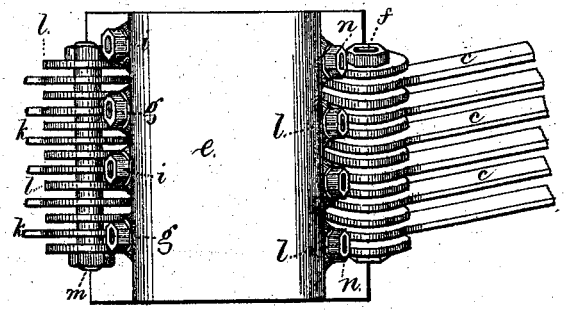
Figure 7:
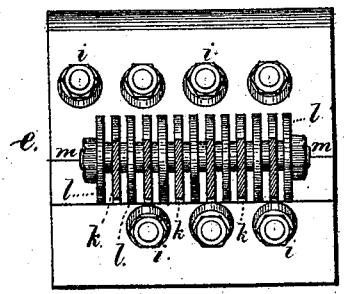
Figure 8:
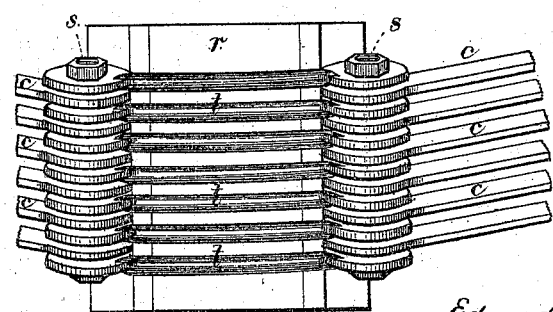

In the drawing, Figure 1 is a plan, illustrating the direction in which the cables hang from the anchors and towers. Fig. 2 is a cross-section of the bridge near the middle of a span. Fig. 3 is a side view of a portion of the chain cable. Fig. 4 is a side view, and Fig. 5 a plan, of the saddle upon the end tower. Fig. 6 shows the joint-eyes on one side, and Fig. 7 those upon the other. Fig. 8 is a plan, and Fig. 9 a side view, of the saddle and joints for the chain at an intermediate tower.

Figure 9:
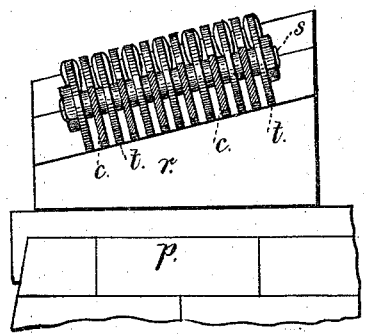

By reference to Figs. 1, 2, and 3, it will be seen that the chain hangs in a plane that is inclined to the vertical, and that the suspending-rods $a\ a$, from the cable to the bridge-beams $b$, are in the same plane. The links $c\ c$ of the chain are of suitable size, and the number of these links will depend upon the strength required. I have shown in Fig. 5 six of the links as extending from each side of the saddle; the number, however, may be more or less. The next range of links may be made with five, and so on; or each link may be so much thinner than the preceding that the catenary shall have the exact section required to resist the strains at its place in the bridge, instead of having a uniform section throughout the cable, as in the case where wires are used. The saddle $e$ is a block of metal, of suitable size, resting upon a cap-plate upon the tower, and the surfaces are allowed to move to compensate expansion and contraction. The links $c$ are connected by the pins $f$ to the eyebolts $g$, that pass through the saddle $e$ to the nuts $i\ i$. These eyebolts $g$ are so placed in the saddle that the pin $f$ will be at right angles to the plane of the cable, as seen in Figs. 4 and 6. The links $k$, that are in the back-stay extending to the anchors, are united to the eyebolts $l\ l$ by the pins $m$, and these eyebolts $l$ extend through the saddle to the nuts $n$. The chains, in passing to the anchors, will usually diverge from the center line of the bridge, but the bolt $m$ will be horizontal, or nearly so, or at any angle of inclination necessary to cause the back-stays to diverge, as required; hence the saddle becomes the means of uniting two portions of the cable that hang in different planes. Where the cable passes over an intermediate pier, $p$, the top of the saddle $r$ is made as a curved and grooved surface that is not horizontal, but at an inclination corresponding to that of the pins $s\ s$, that connect the links $c\ c$ with the saddle-bars $t\ t$. These bars $t\ t$ have eyes at both ends, and they are adapted to lie in the grooves of the saddle $r$, as seen in Figs. 8 and 9, and the centers of these saddle-bars are at right angles to the plane of the curve of the cables. Where there are two or more spans compression-members are used between the two saddles of the intermediate tower.

We claim as our invention—

1. A saddle connecting the two portions of a chain cable at the tower, made with eyebolts, arranged substantially as set forth, so that the chain between the towers may hang in a plane that is inclined to the vertical, substantially as set forth.

2. The saddle for the intermediate tower of the chain suspension-bridge, made with a convex surface inclined at a right angle to the plane of the cable, substantially as set forth.

3. The chain cables for bridges hanging in inclined planes, so as to be closer together at the bottom of the catenary than at the towers, and the joint-pins perpendicular to such inclined planes, substantially as set forth.

Signed by us this 7th day of March, A. D. 1873.

EDWARD W. SERRELL.
EDW. W. SERRELL, JR.

Witnesses:
W. W. LAMAN,
WM. H. BROWN.